United States Patent [19]

Pillar

[11] 4,117,178

[45] Sep. 26, 1978

[54] PHENOLIC ANTIOXIDANTS FOR NON-POLYMERIC HALOGEN COMPOUNDS DURING IMPREGNATION OF STYRENE POLYMER PARTICLES

[75] Inventor: Walter O. Pillar, Monroeville, Pa.

[73] Assignee: ARCO Polymers, Inc., Philadelphia, Pa.

[21] Appl. No.: 848,971

[22] Filed: Nov. 7, 1977

Related U.S. Application Data

[63] Continuation-in-part of Ser. No. 689,026, May 24, 1976, abandoned.

[51] Int. Cl.² .............................................. C08J 9/22
[52] U.S. Cl. ...................... 521/60; 427/222; 521/88
[58] Field of Search .............. 260/2.5 B, 2.5 FP; 427/222; 252/404

[56] References Cited

U.S. PATENT DOCUMENTS

| | | | |
|---|---|---|---|
| 2,676,927 | 4/1954 | McCurdy | 260/2.5 B |
| 3,801,540 | 4/1974 | Dextor | 260/2.5 FP |
| 3,916,016 | 10/1973 | Howell | 260/2.5 FP |
| 4,032,481 | 6/1977 | Pillar | 260/2.5 FP |

*Primary Examiner*—Sam Silverberg
*Attorney, Agent, or Firm*—Lewis J. Young

[57] ABSTRACT

Expandable styrene polymer particles having reduced flammability are made by incorporating from 0.1 to 15 weight per cent of non-polymeric organic halogen compounds into the polymer during impregnation of the polymer particles with a blowing agent in aqueous suspension. Temperatures greater than 90° C., during the impregnation step, often cause degradation of the halogen compound and subsequent degradation of the polymer at the particle surface. The addition of certain hindered phenolic antioxidants, such as di-tert-butyl-p-cresol, stabilizes the halogen compounds in the suspension system to temperatures up to 125° C.

7 Claims, No Drawings

PHENOLIC ANTIOXIDANTS FOR NON-POLYMERIC HALOGEN COMPOUNDS DURING IMPREGNATION OF STYRENE POLYMER PARTICLES

REFERENCE TO RELATED APPLICATIONS

This application is a continuation-in-part of my copending application Ser. No. 689,026, filed May 24, 1976, now abandoned.

BACKGROUND OF THE INVENTION

The invention relates to a process for incorporating non-polymeric halogenated compounds into styrene polymer particles in aqueous suspension during the impregnation of the particles with a blowing agent.

Polymer foams are highly desirable in building construction because of their light weight and good heat insulating property. A prerequisite for use in the construction industry is the foam must have reduced flammability. Many halogenated organic compounds have been proposed as additives for the purpose of reducing the flammability of the foams.

In the case of expandable styrene polymer particles, the non-polymeric halogen compounds are often added to the particles by heating an aqueous suspension of styrene polymer particles in the presence of the halogen compound and a blowing agent until the particles are impregnated with the additives. Impregnation with the blowing agent to produce expandable styrene polymer particles may be carried out at temperatures between 60° and 150° C. However, when the organic halogen compounds are added to the impregnation system, lower temperatures, usually 60°-90° C., are used to prevent decomposition of the halogen compound which may in turn cause degradation of the polymer and subsequent impairment of the expanding and molding properties of the polymer. These lower temperatures require longer time for the impregnation process and, in the case of larger polymer particles, the particles may not be completely impregnated, as shown by the presence of hard cores in the particles after expansion. Shorter times of impregnation and the elimination of hard cores in the particles can both be accomplished by carrying out the impregnation at higher temperatures. It was, therefore, desirable to have a process for impregnation of styrene polymer particles with blowing agents at higher temperatures while still not detrimentally affecting the organic halogen compounds.

SUMMARY OF THE INVENTION

It has now been found that the impregnation of styrene polymer particles with blowing agents in aqueous suspension in the presence of organic halogen compounds can be accomplished at temperatures of between 100° and 125° C. by adding to the suspension, prior to heating, a sterically hindered phenolic antioxidant for the halogen compound.

DETAILED DESCRIPTION OF THE INVENTION

In accordance with the invention, a variety of expandable thermoplastic homopolymers and copolymers can be made to have reduced flammability. The polymers may be derived from vinyl aromatic monomers, such as styrene, vinyl toluene, isopropylstyrene, alphamethylstyrene, chlorostyrene, tert-butylstyrene, etc., as well as copolymers prepared by the copolymerization of at least 50 percent by weight of a vinyl aromatic monomer with monomers such as butadiene, alkyl methacrylates, alkyl acrylates, acrylonitrile and maleic anhydride. For the purpose of convenience, these polymers and copolymers are referred to herein as styrene polymers.

The styrene polymers can, of course, be produced by any of the known techniques, for example by suspension or mass polymerization, to obtain particles in the form of beads or pellets.

To render the polymer particles expandable, the blowing agent is incorporated into the particles, as for example in U.S. Pat. No. 2,983,692, by suspending the particles in water with the aid of suspending agent systems such as tricalcium phosphate in combination with an anionic surfactant.

The blowing agents are compounds which are gases or which will produce gases on heating. Suitable agents include aliphatic hydrocarbons containing from 4-7 carbon atoms in the molecule, such as butane, pentane, cyclopentane, hexane, heptane, cyclohexane, and the halogenated hydrocarbons which boil at a temperature below the softening point of the polymer. Mixtures of these agents may also be used, such as a 50/50 mixture of isopentane/n-pentane, or a 55/45 mixture of trichlorofluoromethane/n-pentane. Usually from 3 to 20 percent of blowing agent per 100 parts of polymer is incorporated by the impregnation.

Conventionally, the impregnations are carried out at temperatures from 60° to 90° C. when the non-polymeric halogen-compounds are utilized, because higher temperatures tend to decompose the halogen-compound causing discoloration of the polymer and actual degradation of the polymer at the particle surface. Unfortunately, the impregnation is slow at these temperatures and the particles are not always impregnated to the core of the particle. This results, on expansion of the particle, in a hard core in the foamed particle. To eliminate this hard core problem, it is desirable to impregnate at temperatures of between 100° and 125° C. The use of these higher temperatures is made possible by the present invention, i.e., the addition during the impregnation process of a phenolic antioxidant for the organic halogen compound.

In the process of the invention, styrene polymer particles are suspended in water with the aid of a difficultly-water-soluble suspending agent, such as tricalcium phosphate and an anionic surfactant extender. To the suspension is added from 0.2 to 15 percent by weight, based on polymer, of the desired halogen-compound, from 3.0 to 20 percent by weight of the blowing agent, and from 0.001 to 0.40 percent by weight of the desired phenolic antioxidant. If used, 0.2 to 2.0 percent by weight of an organic peroxide synergist is also added at this point. The suspension is then heated to a temperature, preferably between 100° C. and 125° C. for 6 to 15 hours to impregnate the polymer particles and uniformly disperse the halogen-compound throughout the polymer. After the impregnation is complete, the particles are cooled to room temperature, acidified with hydrochloric acid, separated from the aqueous medium, and washed with water. The particles are then dried to produce expandable particles which when molded produce foamed articles having reduced flammability.

Depending upon the end use, foamed articles containing larger amounts of halogen-compound, such as amounts greater than 3.0 parts per 100 parts of polymer, are given reduced flammability without the aid of synergistic amounts of organic peroxides. With lesser amounts of the halogen-compound, it is preferred to use from 0.2 to 2.0 parts per 100 parts of polymer of an organic peroxide to aid in the decomposition of the halogen-compound when burned.

Suitable for the synergistic-action are those organic peroxides which decompose at temperatures above 125° C. This limitation is necessary to prevent premature decomposition of the peroxide during the impregnation step. Useful examples are dicumyl peroxide, 2,5-dimethyl-2,5-di(tert-butylperoxy)hexane, 1,3-bis(α-tert-butylperoxyisopropyl)benzene, di(3-tert-butylperoxy-1,3-dimethylbutyl)carbonate, and 2,5-dimethyl-2,5-di(tert-butylperoxy)-3-hexane.

Suitable organic halogen compounds are any of the highly halogenated compounds known to impart reduced flammability to styrene polymer particles. Typical examples are the 1,1,2,3,4,4-hexabromo-2-butene of U.S. Pat. No. 3,819,547; the brominated arylidene ketones of U.S. Pat. No. 3,766,136; the brominated cinnamic acid esters of U.S. Pat. No. 3,766,249; and the brominated aryl butanes of U.S. Pat. No. 3,826,766.

The hindered phenolic antioxidants suitable for use in the invention are the alkylated phenols where the alkyl groups contain 3 to 20 carbon atoms and at least one such alkyl group is located in the position ortho to the hydroxy group of the phenol. The preferred alkyl groups contain 3 to 8 carbon atoms. Conveniently, the alkyl groups may be tert-butyl because of the ready availability of isobutylene as an alkylation starting material. The alkyl groups must be large enough to sterically hinder the hydroxy group from showing tautomerism.

Also suitable antioxidants of this type are the bis-, tris-, and higher condensation products of the hindered alkylated phenols with aldehydes or ketones. Examples of common aldehydes used for the condensation reaction are formaldehyde, acetaldehyde, propionaldehyde, butyraldehyde, crotonaldehyde and benzaldehyde. Exemplary of the common ketones are acetone, ethyl methyl ketone and diethyl ketone.

The alkyl phenols may be prepared by the reaction of phenol or substituted phenol with a monoolefin in the presence of a strong acid catalyst such as sulfuric acid or p-toluenesulfonic acid. Thus, the introduction of isobutylene into a mixture of p-cresol and a trace of concentrated sulfuric acid yields, after neutralizing with sodium hydroxide, 3,6-di-tert-butyl-p-cresol. Similarly, starting with p-hydroxyanisole, one can prepare a mixture of 3-tert-butyl-4-methoxyphenol and 2-tert-butyl-4-methoxyphenol. Other examples of the alkyl phenols prepared by this process are 2,6-diisopropylphenol from propylene and phenol, 2,6-di-tert-octyl-4-methylphenol from diisobutylene and p-cresol, and 2,4,6-tributylphenol from isobutylene and phenol.

The alkylated bisphenols may be prepared from any of the above alkyl phenols by condensation with an aldehyde or ketone in the presence of a strong base, such as alcoholic potassium hydroxide or aluminum phenoxide. Reaction of 2-tert-butyl-p-cresol with formaldehyde in alcoholic potassium hydroxide followed by ether extraction and separation, yielded 2,2'-methylenebis(4-methyl-6-tert-butylphenol).

Exemplary of other bis-and higher-phenols which can be prepared by this process are 4,4'-methylenebis(2,6-dicyclohexylphenol) from 2,6-dicyclohexylphenol and formaldehyde, 4,4'-ethylidenebis(2,6-di-tert-octylphenol) from 2,6-di-tert-octylphenol (made from diisobutylene and phenol) and acetaldehyde, and 2,2'-isopropylidenebis(6-tert-butyl-p-cresol) from 2-tert-butyl-p-cresol and acetone. By a combination of condensation and alkylation reactions of 6-tert-butyl-m-cresol with crotonaldehyde one can produce 1,1,3-tris(2-methyl-4-hydroxy-5-tertbutylphenyl)-butane.

Other known phenolic antioxidants suitable for the invention are 1-naphthol; 1,5-naphthalenediol; octadecyl 3-(3',5'-di-tert-butyl-4-hydroxylphenyl) propionate; tetrakis[methylene 3-(3',5'-di-tert-butyl-4'-hydroxyphenyl)propionate]methane; 4,4'-methylenebis (2,6-di-tert-butylphenol); 2,2'-methylenebis[6-(2-methylcyclohexyl)-p-cresol]; 4,4'-cyclohexylidenebis(2-cyclohexylphenol); 4,4'-butylidenebis(6-tert-butyl-m-cresol); 1,3,5-trimethyl-2,4,6-tris(3,5-di-tert-butyl-4-hydroxybenzyl) benzene; and 2,6-di(1-methylheptadecyl)-p-cresol.

All of these antioxidants can be prepared by the methods suggested, but most are available commercially in one form or another.

Preferably, the total amount of antioxidant added should be between 0.001 and 0.40% by weight based on the weight of styrene polymer particles to be impregnated. Less than 0.001 weight % of the antioxidant does not prevent degradation of the polymer particles, while greater than 0.40% by weight does not appear to serve any useful function. Generally, the amount of antioxidant required is dependent upon the amount of organic halogen compound used and the type of antioxidant used.

The invention is further illustrated by the following examples, wherein percentages are percent by weight unless otherwise indicated.

EXAMPLE I

To a 12-oz. Crown cap bottle was charged 100 g. of water, 2.0 g. of tricalcium phosphate, 0.05 g. of sodium dodecylbenzene sulfonate, 100 g. of polystyrene beads having bead size of between on 30 and through 16 mesh, U.S. Standard Sieve, and an intrinsic viscosity of 0.77 at 30° C. in toluene, 1.1 g. of pentabromomonochlorocyclohexane, 0.875 g. of a mixture of 40 weight percent 1,3-bis(α-tert-butylperoxyisopropyl)benzene adsorbed onto 60 weight percent tricalcium phosphate, 8.5 g. of n-pentane, and, as antioxidant, 0.1 g. (0.1% by wt. based on polymer) of 2,6-di-tert-butyl-p-cresol.

The bottle was capped and cycled 2 hours at 90° C. followed by 10 hours at 110° C. in an oil bath polymerizer. The bottles were then cooled to room temperature, opened, acidified with hydrochloric acid, the beads separated from the aqueous medium, washed with water, and air dried. The resulting polystyrene had an intrinsic viscosity of 0.74 and a water content of 0.1%, indicating little or no degradation of the polymer during impregnation.

The beads were pre-expanded by heating for 2 minutes in steam at 5 psig to give prepuff having a bulk density of 0.91 pounds per cubic foot (pcf).

The prepuffed beads were then overcharged to a 5½ inches × 5½ inches × ½ inch mold cavity, dampened with a water spray, pressed between platens heated to 121° C. for 1 minute, and cooled by circulating water in the platens. The resulting foam plaque had the exact dimensions of the mold, and was fused to the extent of 83% with a foam density of 1.6 pcf. A 1 inch × 5 inch × ½ inch specimen cut from the foam plaque was hung lengthwise from a clamp over a microburner having a ¾ inch yellow flame. The flame was positioned ¾ inch from the bottom edge of the foam sample for 3 seconds. The average vertical burn time (time from withdrawal of the flame to flame-out of the foam) for 5 samples was 0.5 seconds. Polystyrene foam not containing the pentabromomonochlorocyclohexane burned completely in this test.

For comparison, a second bottle was charged identically to the first charge, except without the anioxidant, and was heated in the same manner. The resultant polymer had an intrinsic viscosity of 0.64 and a water content greater than 1%, indicating substantial polymer degradation. On pre-expansion as before, the prepuff had a bulk density of 0.92 pcf. and exhibited "pruning" (i.e. a non-spherical shape due to large internal cells). Foam plaques molded as before were fused to 69% but the molding had shrunk away from the mold and exhibited heat sensitivity, i.e., collapse of the foam cells to an unacceptable degree, and had a foam density of 1.6 pcf. The average vertical burn time for 5 samples was 0.6 seconds.

EXAMPLE II

The procedure of Example I was repeated several times using the percent by weight based on polymer of 2,6-di-tert-butyl-p-cresol (DBPC) shown in Table I. As indicated by the intrinsic viscosities, the molecular weight of the polymer in control run 1 was lower than those of runs 2–5. The control beads molded to give pruned and shrunken moldings with lower fusion than those containing the DBPC.

Table I

| Run No. | 1 | 2 | 3 | 4 | 5 |
|---|---|---|---|---|---|
| DBPC, % | — | 0.01 | 0.05 | 0.1 | 0.4 |
| Intrinsic visc., 30° C. in toluene | 0.64 | 0.74 | 0.73 | 0.74 | 0.76 |
| Prepuff Density, pcf. | 0.92 | 0.98 | 0.98 | 0.91 | 0.95 |
| Molded fusion, % | 69 | 94 | 89 | 83 | 84 |
| Molded Density, pcf | 1.6 | 1.8 | 1.8 | 1.6 | 1.8 |
| Vertical burn, time, secs. | 0.6 | 0.5 | 0.5 | 0.5 | 0.5 |

Similar effects would be obtained if the polystyrene beads to be impregnated are replaced with beads of styrene-maleic anhydride (8.0% anhydride) copolymer beads, styrene acrylonitrile (30.0% nitrile) copolymer beads, or styrene-methyl acid maleate (12.0% maleate) copolymer beads.

EXAMPLE III

To illustrate the range of phenolic and bisphenolic antioxidants applicable for the invention, the procedure of Example I was repeated several times using the antioxidants and amounts thereof shown in Table II. The antioxidants used were (K) 2,6-di-tert-butyl-p-cresol, (L) 2,2'-methylenebis(4-methyl-6-tert-butylphenol), and (M) 1,1,3-tris(2-methyl-4-hydroxy-5-tert-butylphenyl)butane.

Table II

| Run No. | 1 | 2 | 3 | 4 | 5 | 6 | 7 |
|---|---|---|---|---|---|---|---|
| Antioxidant/% | None | K/0.1 | K/0.4 | L/0.1 | L/0.2 | M/0.1 | M/0.4 |
| Intrinsic Viscosity, 30° C. in Toluene | 0.67 | 0.77 | 0.76 | 0.77 | 0.79 | 0.77 | 0.75 |
| Prepuff Density, pcf. | 0.82 | 0.81 | 0.95 | 0.80 | 0.79 | 0.79 | 0.81 |
| Molded Fusion, % | 3 | 86 | 84 | 77 | 85 | 86 | 88 |
| Molded Density, pcf. | 1.0 | 1.5 | 1.8 | 1.5 | 1.3 | 1.4 | 1.4 |
| Vertical Burn Time, secs. | 0.5 | 0.6 | 0.5 | 0.5 | 1.9 | 0.6 | 0.6 |

Similar results were obtained substituting for the 1.1 g. of pentabromomonochlorocyclohexane with 0.35–0.50 g. of 2,3,4,5-tetrabromo-1,5-diphenyl-1-pentanone or 2.2 g. of tris(2,3-dibromopropyl)phosphate as brominated organic compound. Cutting the time of heating to 5 hours allows one to raise the impregnation temperature to 115° C., without degrading the polymer molecular weight or discoloring the polymer by degrading the brominated organic compound.

EXAMPLE IV

To a 12-oz. Crown cap bottle was charged 100 g. of water, 2.0 g. of tricalcium phosphate, 0.05 g. of sodium dodecylbenzene sulfonate, 100 g. of polystyrene beads having bead size of between on 20 and through 10 mesh U.S. Standard Sieve and an intrinsic viscosity of 0.93 at 30° C. in toluene, 1.1 g. of pentabromomonochlorocyclohexane, 0.875 g. of a mixture of 40 weight percent 1,3-bis(α-tert-butylperoxyisopropyl)benzene adsorbed onto 60 weight percent tricalcium phosphate, 5.5 g. of n-pentane and 6.6 g. of trifluorochloromethane, and as antioxidant, 0.05 g. of DBPC.

The bottle was capped and cycled 2 hours at 90° C. followed by 5 hours at 115° C. in an oil bath polymerizer. The bottles were then cooled to room temperature, opened, acidified with hydrochloric acid, the beads separated from the aqueous medium, washed with water, and air dried. The resulting polystyrene had an intrinsic viscosity of 0.92 and a water content of 0.1%, indicating little or no degradation of the polymer during impregnation.

The beads were pre-expanded by heating for 2 minutes in steam at 5 psig to give prepuff having a bulk density of 0.90 pounds per cubic foot (pcf.).

The prepuffed beads were compression molded as in Example I and resulting foam plaque had the exact dimensions of the mold, and was fused to the extent of 74% with a foam density of 1.6 pcf.

The average vertical burn time (as measured in Example I) for 5 samples was 0.6 seconds. Polystyrene foam not containing the pentabromomonochlorocyclohexane burned completely.

For comparison a second bottle was charged identically to the first charge, except without the antioxidant, and was heated in the same manner. The resultant polymer had an intrinsic viscosity of 0.78 and a water content greater than 1%, indicating substantial polymer degradation. On pre-expansion as before, the prepuff had a bulk density of 0.87 pcf. and exhibited pruning. Attempts to form foam plaques molded as before were unsuccessful because the molding had shrunk away from the mold and exhibited heat sensitivity, i.e., collapse of the foam cells to an unacceptable degree, so that neither foam density nor foam fusion could be measured.

EXAMPLE V

To illustrate that the usefulness of a compound as a stabilizer cannot be predicted in an aqueous impregnation of polystyrene beads, the following was carried out:

To each of a series of 12-oz. Crown cap bottles was charged 100 g. of water, 2.0 g. of tricalcium phosphate, 0.05 g. of sodium dodecylbenzene sulfonate, 100 g. of polystyrene beads having bead size of between on 20 and through 10 mesh (U.S. Standard Sieve) and an intrinsic viscosity of 0.74 at 30° C. in toluene, 1.1 g. of pentabromomonochlorocyclohexane, 0.875 g. of a mixture of 40 weight percent 1, 3-bis(x-tert-butylperoxyisopropyl) benzene adsorbed onto 60 weight percent tricalcium phosphate, 8.5 g. of n-pentane, and as antioxidant, the amounts of additives shown in the Table III.

The bottles were capped and cycled 2 hours at 90° C. followed by 3 hours at 125° C. in an oil bath polymerizer. The bottles were then cooled to room temperature, opened, acidified with hydrochloric acid, the beads separated from the aqueous medium, washed with water and air dried.

The polymer intrinsic viscosity was measured, again at 30° C. in toluene, and the polymers were compression molded as in Example I and condition of the foams noted. The results are shown in Table III.

Table III

| Antioxidant Added | % Added | Intrinsic Viscosity | Condition Of Foam |
|---|---|---|---|
| None | — | 0.62 | Large Cell, Irregular Unmoldable |
| Dibutyl-p-cresol | 0.1 | 0.72 | Sl. large cell, moldable |
| Benzoic Acid | 0.1 | 0.61 | (Large Cell, |
|  | 0.25 | 0.64 | (Irregular (Unmoldable |
| Sodium (Tripoly) Phosphate | 0.1 | 0.57 | (Suspension (Failed |
|  | 0.25 | 0.59 | ([not molded] |
| Dilithium Salt of Versenic Acid | 0.1 | 0.59 | (Large Cell, |
|  | 0.25 | 0.59 | (Irregular (Unmoldable |
| Tetraphenyl Tin | 0.1 | 0.62 | (Large Cell, |
|  | 0.25 | 0.60 | (Irregular (Unmoldable |

The antioxidants used and shown in Table III were all listed in U.S. Pat. No. 2,676,927 as stabilizers for organic bromides. The hindered phenol (dibutyl-p-cresol) was the only one that prevented molecular weight degradation of the polystyrene (as determined by intrinsic viscosity) and resulted in a usable foam product.

I claim:

1. In a process for making styrene polymer particles less flammable by impregnating the polymer particles by heating in aqueous suspension in the presence of a non-polymeric organic halogen compound and a blowing agent at temperatures between 100° C. and 125° C., the improvement comprising adding, prior to heating for the impregnation, about 0.001 to 0.40 percent by weight based on polymer particles of a hindered phenolic antioxidant consisting essentially of an alkylated phenol where said alkyl groups contain from 3 to 20 carbon atoms and at least one such alkyl group is in the position ortho to the hydroxy group of the phenol, whereby the polymer molecular weight is not degraded during the aqueous impregnation process.

2. The process of claim 1 wherein said hindered phenolic antioxidant is selected from the group consisting of alkylated phenols, and their bis-, tris- and higher condensation products with aldehydes and ketones.

3. The process of claim 1 wherein said alkylated phenol is selected from the group consisting of 1-naphthol; 2,6-di-tert-butyl-p-cresol; 3-tert-butyl-4-methoxyphenol; 2-tert-butyl-4-methoxyphenol; 2,6-diisopropylphenol; 2,4,6-tri-tert-butylphenol; 2,6-di(1-methylheptadecyl)-p-cresol; octadecyl 3-(3',5'-di-tert-butyl-4-hydroxyphenyl)-propionate; and mixtures thereof.

4. The process of claim 2 wherein the antioxidant is a bis-condensation product of alkylated phenols with an aldehyde selected from the group consisting of formaldehyde, acetaldehyde, propionaldehyde, butyraldehyde, crotonaldehyde and benzaldehyde.

5. The process of claim 2 wherein the antioxidant is a bis-condensation product of alkylated phenols with a ketone selected from the group consisting of acetone, ethyl methyl ketone and diethyl ketone.

6. The process of claim 2 wherein the antioxidant is selected from the group consisting of 2,2'-methylenebis(4-methyl-6-tert-butylphenol); 4,4'-methylenebis(2,6-dicyclohexylphenol); 4,4'-methylenebis(2,6-di-tert-butylphenol); 2,2'-methylenebis[6-(2-methylcyclohexyl)-p-cresol]; 4,4'-ethylidenebis(2,6-di-tert-octylphenol); 2,2'-isopropylidenebis(6-tert-butyl-p-cresol); 4,4'-butylidenebis(6-tertbutyl-m-cresol); 4,4'-cyclohexylidenebis(2-cyclohexylphenol); 1,5-naphthalenediol; 1,1,3-tris(2-methyl-4-hydroxy-5-tertbutylphenyl)butane; 1,3,5-trimethyl-2,4,6-tris(3,5-di-tertbutyl-4-hydroxybenzyl)benzene; and tetrakis[methylene 3-(3',5'-di-tert-butyl-4'-hydroxyphenyl)propionate]methane.

7. The process of claim 1 wherein said styrene polymer particles are selected from the group consisting of polystyrene, a copolymer of styrene with less than 50% by weight of maleic anhydride, a copolymer of styrene with less than 50% by weight of acrylonitrile, and a copolymer of styrene with less than 50% by weight of methyl acid maleate.

* * * * *